US008675999B1

(12) United States Patent  
Liang et al.

(10) Patent No.: US 8,675,999 B1  
(45) Date of Patent: Mar. 18, 2014

(54) APPARATUS, SYSTEM, AND METHOD FOR MULTI-PATCH BASED SUPER-RESOLUTION FROM AN IMAGE

(71) Applicants: Luhong Liang, Shatin (HK); King Hung Chiu, Shatin (HK); Edmund Y. Lam, Pokfulam (HK)

(72) Inventors: Luhong Liang, Shatin (HK); King Hung Chiu, Shatin (HK); Edmund Y. Lam, Pokfulam (HK)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 25 days.

(21) Appl. No.: 13/630,803

(22) Filed: Sep. 28, 2012

(51) Int. Cl.  
  *G06K 9/32* (2006.01)
(52) U.S. Cl.  
  USPC .......................................... 382/299
(58) Field of Classification Search  
  USPC ........................ 382/164, 254, 276, 284, 299  
  See application file for complete search history.

(56) References Cited

U.S. PATENT DOCUMENTS

| | | | |
|---|---|---|---|
| 7,688,363 B2 | 3/2010 | Sato et al. | |
| 7,715,658 B2 | 5/2010 | Cho et al. | |
| 7,974,498 B2 | 7/2011 | Ben-Ezra et al. | |
| 8,538,201 B2 * | 9/2013 | Damkat | 382/299 |
| 2007/0133903 A1 * | 6/2007 | Zomet et al. | 382/299 |
| 2011/0010370 A1 | 1/2011 | Cosgrove | |
| 2011/0037894 A1 | 2/2011 | Sbaiz | |
| 2011/0221966 A1 | 9/2011 | Hsieh et al. | |

* cited by examiner

*Primary Examiner* — Duy M Dang  
(74) *Attorney, Agent, or Firm* — Fulbright & Jaworski LLP

(57) ABSTRACT

Embodiments of the present invention include apparatuses, systems and methods for multi-patch based super-resolution from a single video frame. Such embodiments include a scale-invariant self-similarity (SiSS) based super-resolution method. Instead of searching HR examples in a database or in LR image, the present embodiments may select the patches according to the SiSS characteristics of the patch itself, so that the computational complexity of the method may be reduced because there is not any search involved. To solve the problem of lack of relevant examples in natural images, the present embodiments may employ multi-shaped and multi-sized patches in HR image reconstruction. Additionally, embodiments may include steps for a hybrid weighing method for suppressing artifacts. Advantageously, certain embodiments of the method may be 10~1,000 times faster than the example based SR approaches using patch searching and can achieve comparable HR image quality.

31 Claims, 10 Drawing Sheets

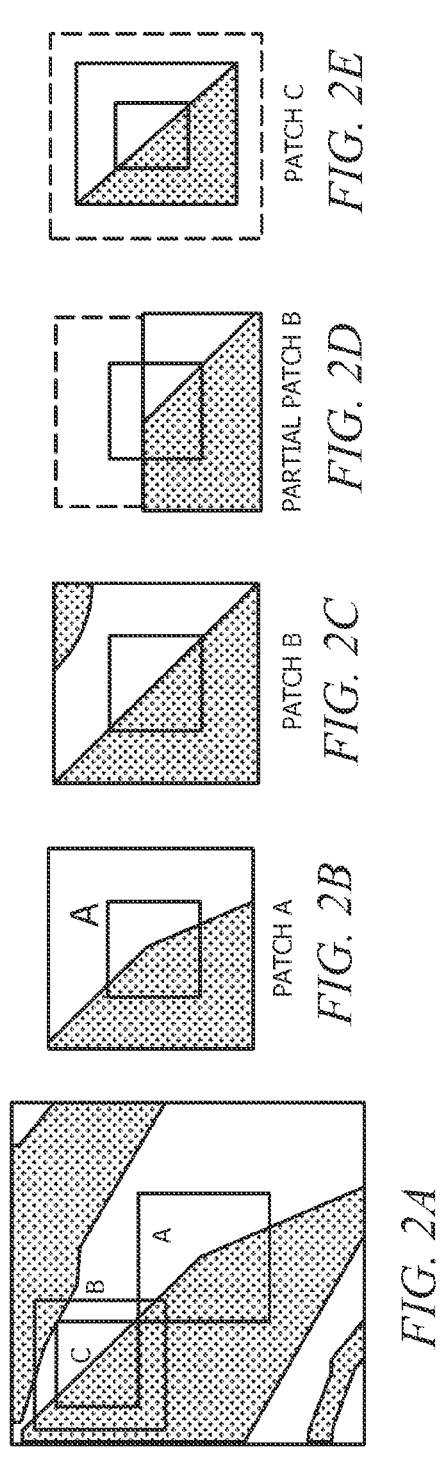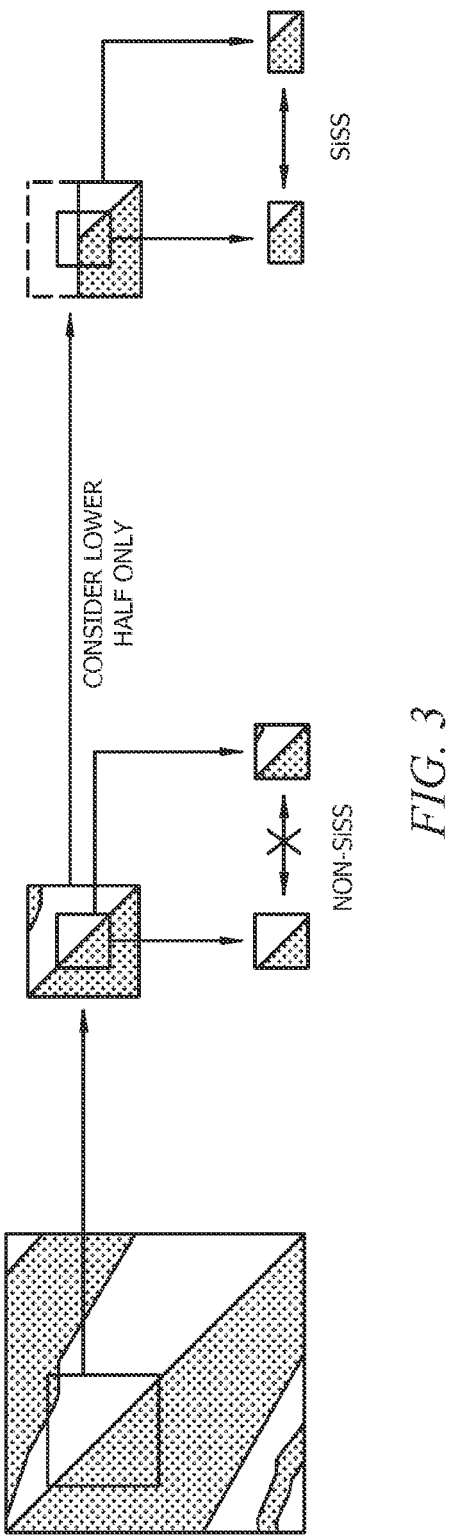

*FIG. 12*

APPARATUS, SYSTEM, AND METHOD FOR MULTI-PATCH BASED SUPER-RESOLUTION FROM AN IMAGE

TECHNICAL FIELD

The present invention relates generally to image and video processing and, more particularly, to apparatuses, systems, and methods for super-resolution from an image.

BACKGROUND OF THE INVENTION

Super-resolution (SR) methods aim to recover new high-resolution (HR) information beyond the Nyquist frequency of the low-resolution (LR) image. SR methods are applicable in relation to HDTV, video communication, video surveillance, medical imaging, and other applications. Recently, example-based SR (also commonly referred to as "hallucination") that reconstructs HR image from one single LR input image has emerged as a promising technology because it can overcome some limitations of the classical multi-image super-resolution methods and can be implemented with lower computation and memory costs.

Example-based SR methods assume that the missing HR details can be learned and inferred from a representative training set or the LR image itself. For example, an image predication model may rely on a database of example patches with the low-frequency and the residual higher frequency bands built using a training image set. The LR image is partitioned into a plurality of overlapping patches. For each patch, a search is performed in a database according to the low-frequency component of the example patches to identify the corresponding high frequency band for reconstruction. Other representative approaches of this kind include Kernel Ridge Regression based SR methods, sparse coding based SR methods, etc. These types of SR approaches are capable of producing plausible fine details across the image; however, a lack relevant examples in the database often causes noisy images and irregularities along curved edges. Moreover, the use of larger databases is more time and memory consuming and effective hardware implementation may be a challenge.

Another example-based SR method employs the self-similarity characteristics of the image, i.e. based on the observation that small patches in a natural image tend to redundantly recur many times inside the image. In one prior method both the patch recurrence within the same image scale and across different coarser image scales were employed to recover information among subpixel misalignments and implicit low-resolution/high-resolution pairs. A single unified computational framework was used to combine these two SR approaches and an Approximate Nearest Neighbor (ANN) algorithm is employ to accelerate the patch searching. In another method, a dictionary of lower-resolution/high-resolution pairs was built online using the image pyramid of the input LR image and was then refined using group sparsity constraints. HR images were reconstructed using an ΔNN search in the dictionary. In still another method, a local self-similarity assumption on natural images were followed, so that patches were extracted from localized regions as small as 10×10 rather than the whole input image. This method reduced the nearest-patch search time considerably, without compromising quality in most images. In still another method, a non-local back-projection method was proposed, where a local search in a small window was employed to recover non-local redundancies and suppress "jaggy" and "ringing" artifacts. As opposed to small upscale steps, for example 4×4 to 5×5, in other aforementioned algorithms, the image is typically enlarged two times in each direction, so that it could reach the target image enlargement ratio by just building one or two layers of reconstructed images.

Such example-based SR algorithms are often computationally intensive, because for each pixel or patch the methods require searching the high-resolution counterpart in a database/dictionary, an image pyramid or a small image region. Although efforts have been made to reduce the computational complexity, it is still a major challenge to the commercial application of the SR technology.

BRIEF SUMMARY OF THE INVENTION

Embodiments of the present invention include apparatuses, systems and methods for multi-patch based super-resolution from a single image. As used herein, the term "image" means a visual representation of something obtained by capturing light or electromagnetic radiation corresponding to an object. The term image may include a still image or a frame of video. Such embodiments may include a scale-invariant self-similarity (SiSS) based super-resolution method. Instead of searching HR examples in a database or in LR image, the present embodiments may select the patches according to the SiSS characteristics of the patch itself, so that the computational complexity of the method may be reduced because there is not any search involved. To solve the problem of lack of relevant examples in natural images, the present embodiments may employ multi-shaped and multi-sized patches in HR image reconstruction. Additionally, embodiments may include steps for a hybrid weighing method for suppressing artifacts. Advantageously, certain embodiments of the method may be 10~1,000 times faster than the example based SR approaches using patch searching and can achieve comparable HR image quality.

In one embodiment, a method for generating a super-resolution image from a single low resolution image includes partitioning the low resolution image into a plurality of overlapped patches of multiple shapes and multiple sizes. Additionally, the method may include processing the patches in a sequential order. In one embodiment, the method includes comparing the whole patch and its central region to obtain the similarity for each patch. The method may also include selecting patches with the similarity larger than a threshold. Additionally, the method may include reconstructing the enlarged central region of the low resolution patch using the weighted low resolution patch. Additionally, the method may include applying back-projection to the enlarged image.

In one embodiment, the multiple shapes include the whole patch and partial patches that are partitioned by one or multiple lines from the central point to the boundary of the patch. Comparing the patch and its central region may include downscaling the patch or partial patch to the same size as the central region and calculating a similarity measurement between the central region of the original patch or partial patch and the downscaled patch or partial patch. In a particular embodiment, the selecting operation further includes dividing the multiple-shaped patches centered by the same location into a plurality of sub-sets, and in each sub-set selecting top N patches among the patches with the similarity larger than a threshold.

In a further embodiment, the reconstructing operation includes calculating the first weight using the similarity measurement, linearly mapping each pixel of the central region of the patch to corresponding pixels in the patch, calculating the second weight for each pixel using the difference between the corresponding pixels of the patch and the central region, obtaining the weight for each pixel by combining the first and the second weights, and computing a weighted sum of pixels in this patch and pixels in other overlapped patches.

In a further embodiment, the central region has the same shape as the patch or partial patch and is centered by the central point of the patch if the patch is the whole patch and/or centered by the central point of the corresponding whole patch if the patch is the partial patch. The proportion between the size of the central region and the patch may be the same as the proportion between the low resolution image and the enlarged image.

In a further embodiment, calculating a similarity measurement operation further comprises an addition tree to calculate the similarity measurements of the whole patch and the corresponding partial patches at the same location.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 2A illustrates one example image that includes SiSS and non-SiSS patches.

FIGS. 2B-E illustrate the patches and partial patches marked in the image in FIG. 2A.

FIG. 3 illustrates an embodiment of a method for handling a non-SiSS patch using multi-shaped patches.

FIG. 12 illustrates an example of a 4×4 pixel patch in the ½-pixel image.

DETAILED DESCRIPTION OF THE INVENTION

Figure 1A:
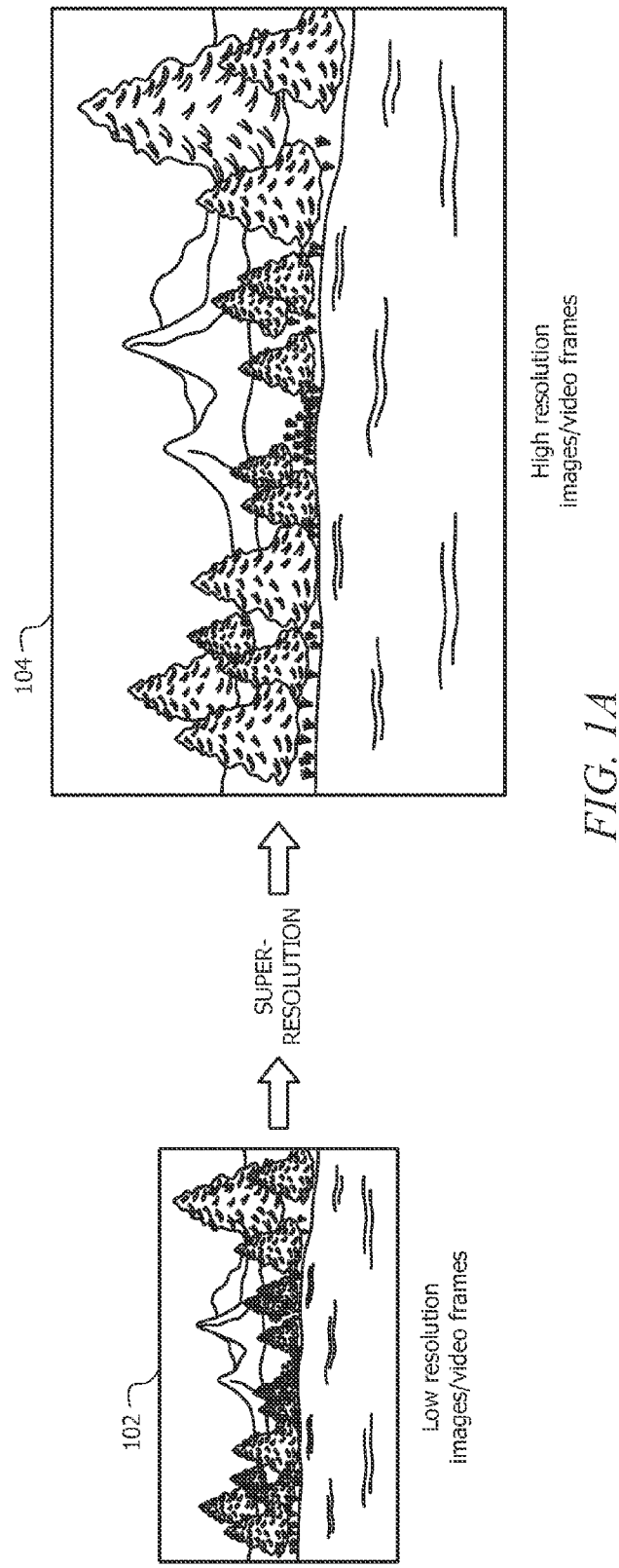
FIG. 1A illustrates one embodiment of a method for generating a high resolution image or video frame from a low resolution image or video frame.

FIG. 1A illustrates one embodiment of a method for generating a high resolution image or video frame from a low resolution image or video frame 102. As illustrated, a super-resolution method may be used to convert a low resolution natural image or video frame 102 into a high resolution image or video frame 104 for display on high resolution display devices or devices for successive image or video processing, analysis, transmission or other functionalities.

Self-similarity is a characteristic of natural image 102 where the local visual content tends to repeat itself within and across the scales of the image. Based on this assumption, an example-based SR patch recurrence is recovered by searching similar patches in the input LR image 102 in one or multiple scales and then is used to reconstruct HR image 104. In one embodiment, the local visual content looks the same at every scale. This phenomenon may be referred to as Scale-invariant Self-Similarity (SiSS), which typically happens in local structures like edges and corners in the natural image. Formally, supposing an image patch P that contains a certain local structure, we can measure the SiSS characteristics of P by $$siss = \min_s(F(C_s(P), D_s(P))), \tag{1}$$

where $D_s(\bullet)$ denotes the down-sample operation of a scaling factor s, $C_s(\bullet)$ is the central region of P with the same size as $D_s(P)$, and $F(\bullet)$ is a patch-to-patch similarity measurement. A high SiSS value represents that the local structure looks the same in any scale under the similarity $F(\bullet)$.

Additionally, if a local visual content is SiSS in a certain resolution, it will keep its structure and SiSS characteristic in higher resolution. This assumption has been partially proved in statistical research on edge sharpness, where it is shown that the distribution of the gradient profile sharpness of the edges keeps consistent in different resolutions. The difference in this embodiment is that the SiSS is not only a characteristic of the edge but also of more general local structures like corners in the natural image. If a patch P has high SiSS, P and its central region $C_s(P)$ can be considered as a high-resolution/low-resolution pair of the same local visual content. In this case, P may be copied to an enlarged image as a high-resolution reconstruction of $C_s(P)$. In other words, instead of searching similar patches like self-similarity based SR method, the present embodiments measure the SiSS of local visual contents and select those eligible ones to directly reconstruct high-resolution contents. Since such embodiments avoid the need of patch searching, the high-resolution image can be reconstructed with comparatively low computational cost.

Figure 1B:
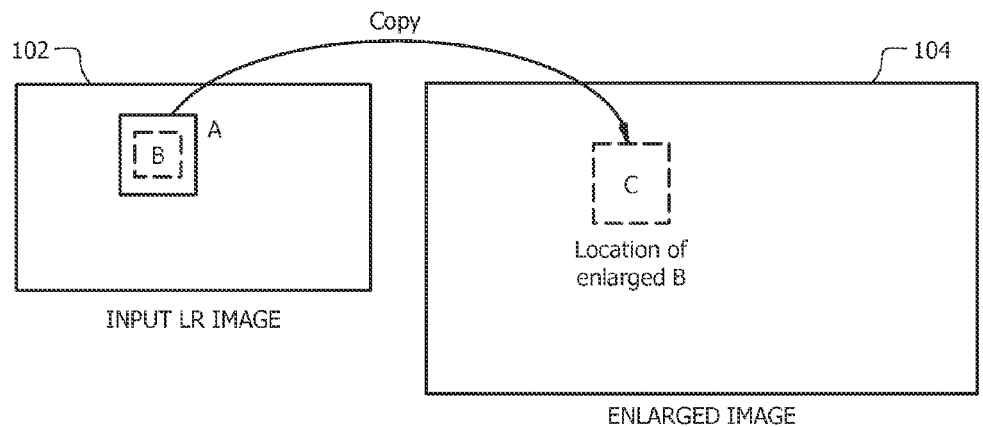
FIG. 1B illustrates the super-resolution reconstruction using SiSS measurement.

FIG. 1B. illustrate the image reconstruction process using the above SiSS measurement and patch selection. The input image is partitioned into a plurality of small patches that may overlap with each other. Path A is one of the plurality patches that satisfy the SiSS characteristics. B is the central region of A, where the proportion between the size of B and A is the same as the proportion between the input low resolution image and the enlarged image. Region C is the corresponding location of B if the input low resolution image is enlarged. Since the patch A satisfy the SiSS characteristics, we consider A is a high resolution example of B. So that, when we reconstruct the enlarged image, we directly copy A to C as a high resolution reconstruction result of B. Apparently, patch A contains more original image detail information than directly enlarged B using bicubic interpolation or other similar technologies, so that the reconstructed image will have more image detail information besides keeping the sharpness of edges.

In practice, the SiSS criterion described in Equation (1) can be loosed to a specific scale factor. Supposing that P(x,y) is a square patch of size W×W and assuming a scale factor of 2, the negative mean square error (MSE) as the similarity measurement may be used to simplify the SiSS measurement to:

$$siss = - \operatorname*{MSE}_{-\frac{W}{4} \leq x, y \leq \frac{W}{4}} (P(x, y), P_\downarrow(x, y)), \quad (2)$$

where $P_\downarrow$ denote the ½-down-sampled patch P. If the SiSS is larger than a given threshold, patch P(x,y) is determined to be SiSS.

If a natural image 102 has sufficient local visual contents with SiSS, a high-resolution image 104 can be reconstructed using direct copies of those contents. However, in natural images 102 only a small portion of local visual contents like edge and corner structures are SiSS, even if the SiSS criterion were relaxed to Equation (2). The present invention solve this problem using multi-shaped and multi-sized patches.

For example, FIG. 2A shows an image stripe region, where patch A is SiSS since its central region shown as the larger box around letter 'A' as in FIG. 2B looks the same as the patch itself. In the example image, only a very small portion of patches exactly along edges can satisfy SiSS. There are more patches like patch B. As shown in FIG. 2C, patch B is not SiSS just because of a darker region at the top right corner. If we only take the lower part of patch B into account, obviously the lower partial patch can satisfy SiSS. In this case, the lower part can be directly copied to reconstruct the high-resolution image.

Figure 7A:
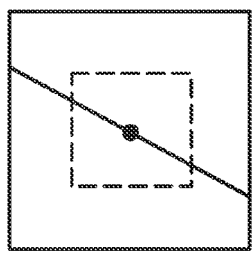
FIGS. 7A-C illustrate embodiments of various patch geometries.

FIG. 3 further illustrate the processes of selecting patches of differing. As illustrated in FIG. 3, a patch may be divided into multiple portions using a plurality of straight lines from the central point and the boundary of the patch. This is illustrated in further detail in FIGS. 7A-C, where the dot lines mark the corresponding central regions of the partial patches. Here the SiSS calculation Equation (2) can be re-written as $$siss(m) = - \operatorname*{MSE}_{(x,y) \in P(m) \cap \{(x,y) | -\frac{W}{4} \leq x, y \leq \frac{W}{4}\}} (P(x, y), P_\downarrow(x, y)), \quad (3)$$

where P(m) represents the valid pixels in the partial patch. Obviously, the siss value of the partial patch may be larger than that of the square patch. Therefore, greater portions of the original square patch may satisfy the SiSS criterion, and there may be a greater chance that the HR image 104 may be reconstructed from the original natural image 102.

Figure 4:
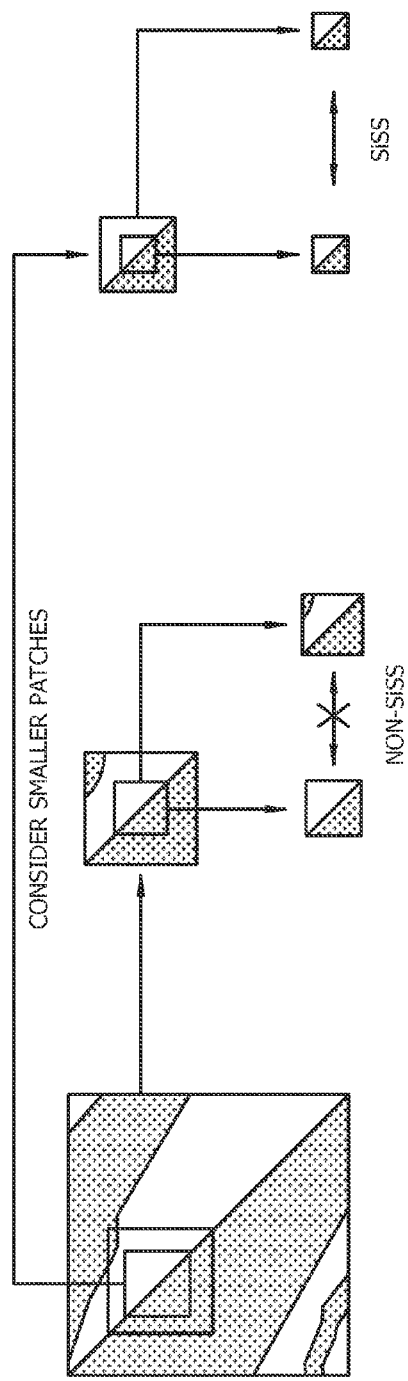
FIG. 4 illustrates an embodiment of a method for handling a non-SiSS patch using multi-sized patches.

Considering patch B in FIG. 2A, which is not SiSS, we can see if a smaller patch C inside and at the center of patch B is considered as shown in FIG. 2E, it becomes SiSS. For a natural image of given resolution, the smaller the patch, the more patches and partial patches that may be SiSS. FIG. 4 illustrates a method for using multi-sized patches to reconstruct an HR image 104.

After collecting sufficient patches that are SiSS, the high-resolution is reconstructed by blending those patches. A most straight-forward method is to calculate the weighted average of the overlapped patches, where the same weighting is assigned to all the pixels of a certain patch. In one embodiment, the weighting depends on the SiSS characteristics of the patch, i.e. the SiSS calculated by Equation (3). For example, an exponential function of SiSS may be used to calculate the weighting factor:

$$w = \exp(siss/\sigma_P), \quad (4)$$

where $\sigma_P$ is a parameter to control the dependency between the weighting and the SiSS characteristics.

Figure 5A:
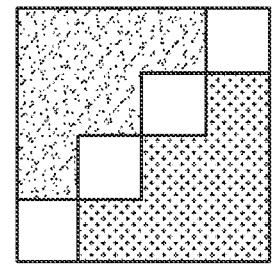
FIGS. 5A and 5B illustrate one example of a patch having an outlier and its central region.
Figure 5B:
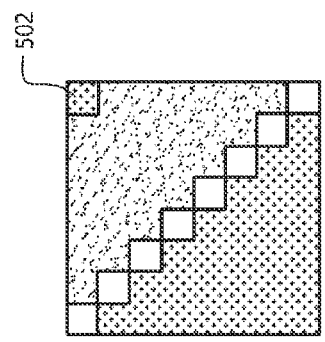

The negative value of MSE in Equation (2) or (3) only describes the overall similarity between the patch and its central region. However, in a patch in the natural image there always have some "outlier" pixels that cannot described by the overall similarity. FIGS. 5A and 5B show an example, where FIG. 5A shows a patch with a dark pixel (pixel 502) at the top right corner and FIG. 5B shows the zoom-in view of its central region. By Equation (2) (3) and (4) it will get a large SiSS value as well as a large weight. In such an embodiment, the patch with high weight may cause artifacts similar to "holo" or ringing in the reconstructed image. For those partial patches, similar examples of "outlier" pixels can be found.

To solve this problem, the pixel-to-pixel difference between the patch and its central region is considered in patch weighting. A new exponential function of the pixel-to-pixel difference is added into Equation (4) and the weight is calculated by $$w(x,y) = \exp(siss/\sigma_P) \cdot \exp(-|(P(x,y) - P_\downarrow(u,v)|/\sigma_I), \quad (5)$$

where $u = \lfloor x/2 \rfloor$ $v = \lfloor y/2 \rfloor$ and $\sigma_I$ is a parameter to control the dependency between the pixel-to-pixel difference and the weight. For those "outlier" pixels, the second term in Equation (5) will alleviate their impacts to the reconstructed image, so that the artifacts in the reconstructed image can be reduced. Compared with Equation (4), the proposed weighting method described in Equation (5) has an additional exponential function. For an image of 8-bit pixel depth, there are only 256 possible values of the second term, so that the exponential function can be efficiently realized by a lookup table (LUT).

Figure 6:
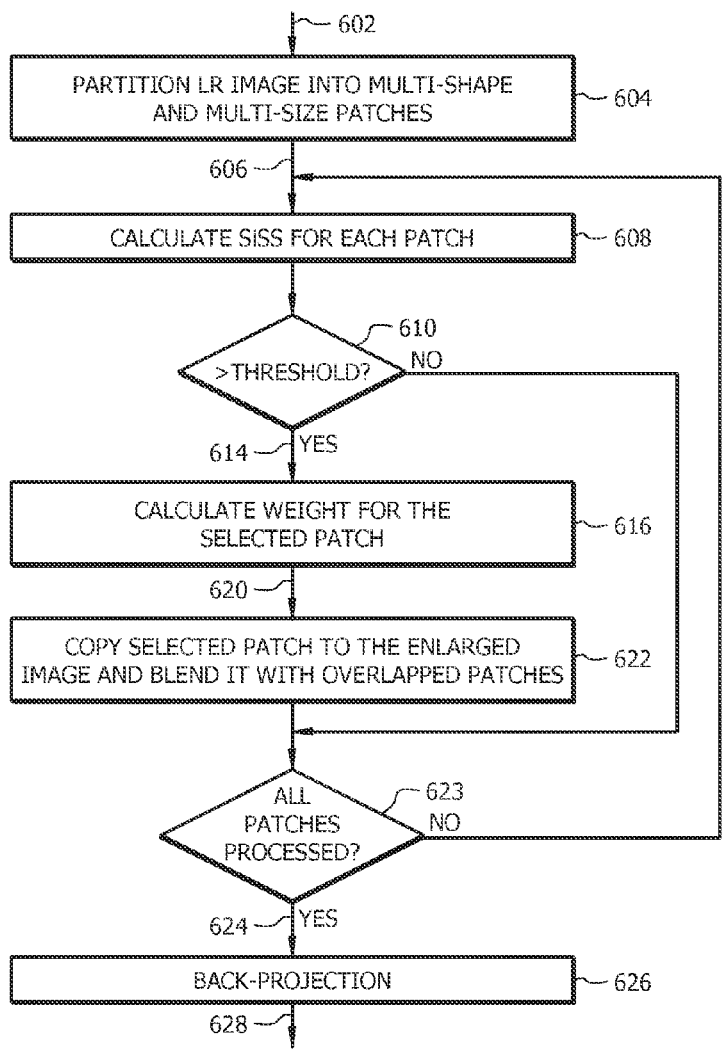
FIG. 6 illustrates a flow chart illustrating one embodiment of the multi-patch based super resolution method.

FIG. 6 illustrates one embodiment of method 600 for multi-patch based super-resolution from a single video frame, where the key features aforementioned are combined together. In the embodiment, method 600 includes receiving low resolution image 102 at block 602. Then, at block 604, method 600 includes partitioning low resolution image 102 into multi-shaped partitions or patches 606. In some embodiments, block 604 may firstly partition the low resolution image into square partitions using a sliding window, and then further partition each square patch into multiple partial patches to obtain the plurality of multi-shaped patches 606; while in other embodiments, block 604 may partition the low resolution image into multi-shaped patches 606 directly using a sliding window with variable-shaped masks.

Figure 7B:
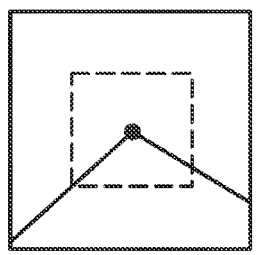
Figure 7C:
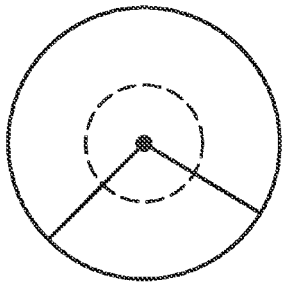

In alternative embodiments block 604 may be implemented or adapted for use with the present embodiments of the method, system, and apparatus described herein. For example, the partial patches can be generalized in three aspects: first, a straight line across the center of the patch can be used to partition the patch into two partial patches in any angle, and then both parts can be used as partial patch for SiSS calculation, as illustrated in FIG. 7B; second, the partial patch can be divided by two straight lines from the patch center to the boundary at any angles, as illustrated FIG. 7B; and third, the patch can be other shapes, i.e. a round shape as shown in FIG. 7C.

In some embodiments, block 604 may also include partitioning low resolution image 102 into multi-sized partitions instead of or in addition to the multi-shaped.

In some embodiments, at block 604 each patch may be partitioned by shifting a window of the same size and shape of the patch in m/n pixel step in the low resolution image, when the proportion between the size of the central region and the patch is m:n, i.e. the upscale ratio is n/m. In this case, the patches have been aligned to the grid of the high resolution image, and more importantly, it makes the patches m/n-pixel misalignment to each other, so that it is possible to recover the high frequency information. In some embodiments, the sliding window with m/n-pixel displacement may be obtained by bicubic interpolation, edge-guided interpolation, or other interpolation methods. In other embodiments, these interpolation operations can be pre-calculated and the results can be stored in a buffer, so that the patches can be directly fetched in the buffer in the partitioning step.

Then, at block 608, method 600 may include calculating the SiSS for each patch.

At blocks 610, one or more thresholds may be applied to the SiSS values for patch selection. A square patch or partial patch may be selected if the SiSS value corresponding to the square patch or partial patch is above a threshold. In some embodiments, the square patch and the corresponding partial patches generated by partitioning this square patch may be considered as a group, and only the best size or shape of patch in this group may be selected based on their SiSS values and in comparison with the threshold. In other embodiments, the square patch and the corresponding partial patches generated by partitioning this square patch may be divided into multiple groups according to features like size and/or shape, and only the best size or shape of patch in each group may be selected based on their SiSS values and in comparison with the threshold.

At block 616, a weighting factor may be determined for the selected square patch or partial patch 614. In one embodiment, the weighting factor may be calculated by Equation (5) directly. In another embodiment, a LUT may be pre-calculated offline using Equation (5) and may be used in weighting factor calculation in block 616. In one embodiment, the weight factor may be still calculated by Equation (4). In other embodiments, different weighting methods such as Equation (4), Equation (5) and LUT may be applied to different shaped and/or sized patches.

Figure 1C:
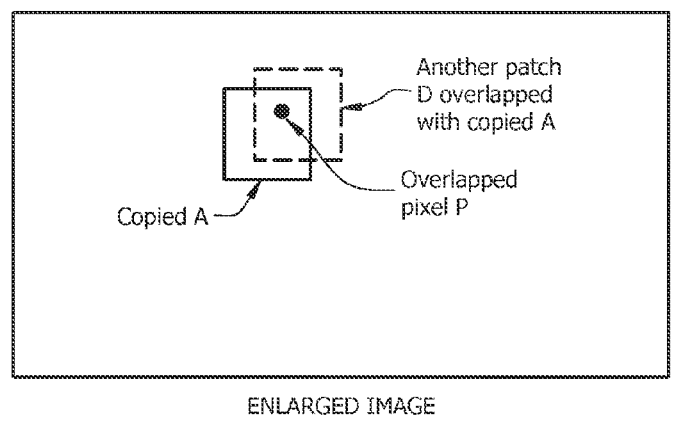
FIG. 1C illustrates one embodiment of a blending operation.

At block 622, the weighted patches may be copied to a grid of the enlarged image and be blended. FIG. 1C. illustrates the blending process after patch copy. In this example, patch A is copied to the enlarged image. Since the input low resolution image is partitioned into a plurality of small patches, there may other patches such as patch D is copied to the enlarged image because it satisfies SiSS and has overlap with the copied patch A. In this case, for each overlapped location P, which has one pixel belongs to the copied patch A and another pixel belongs to the patch D, a blending process is used to obtain the final pixel value at location P by weighted sum of the two pixel values in the copied patch A and the patch D. For location where multiple pixels are overlapped, the blending process calculates the weighted sum of each pixel as the final pixel value, which can be formulated by:

$$p(x, y) = \frac{\sum_{i \in overlapped} p_i(x, y) \cdot w_i(x, y)}{\sum_{i \in overlapping} w_i(x, y)}, \quad (6)$$

where $p_i(x,y)$ is the overlapped pixel belong to a certain patch, $w_i(x,y)$ is the corresponding weighting factor for $p_i(x,y)$, and $p(x,y)$ is the final pixel value obtained. In some embodiments, the denominator and the numerator in Equation (6) may be stored in buffers respectively, and the division operations are performed after all the patches are copied.

At block 626, back projection is performed on reconstructed image 624 to keep consistency between the reconstructed image 104 and the input LR image 102. Finally, at block 628, the high resolution image 104 is outputted.

There may be other embodiments similar to method 600 or utilize method 600 as an individual module. In some embodiments, the method 600 may be used repeatedly to build a very large image layer by layer. For example, supposing method 600 can enlarge the input image 2 times in both X and Y directions, it can apply method 600 two times to get an image that is 4 times larger in both X and Y directions than the input image. In some embodiments, method 600 may be only used in some regions or pixels of the image rather than the whole image. These regions or pixels may be determined by edge detection (such as Sobel operator, Laplacian operator and Canny edge detector), local entropy or other local features, results of image segmentation, results of object detection, or user defined Region of Interest (ROI). One of ordinary skill in the art will recognize other suitable methods to determine the region for method 600 according to the application requirement. In other embodiment, method 600 except for block 626 may be only used in some regions or pixels of the input image rather than the whole image; while block 626 is still applied to the whole image to get better consistency between input and output images.

Figure 8:
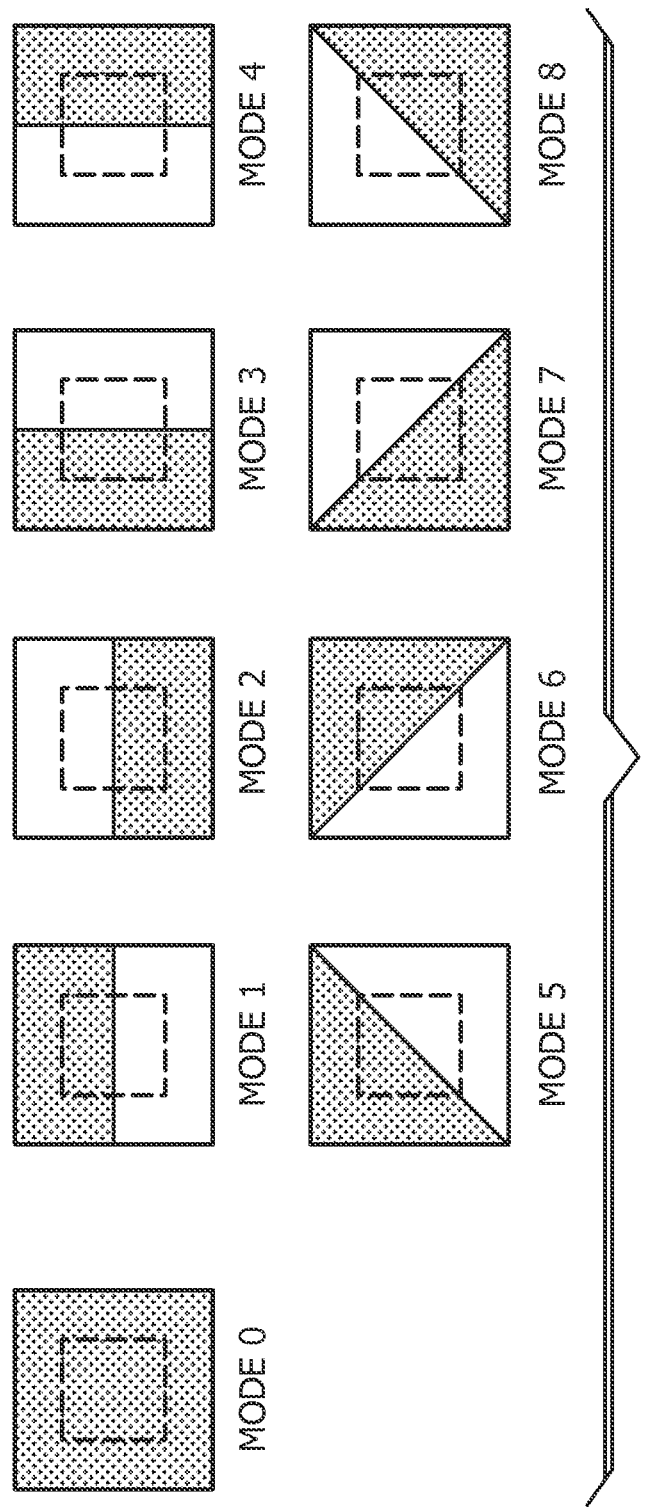
FIG. 8 illustrates embodiments of various partial patch sampling modes and the corresponding central region.

In one embodiment, image enlargement with a scale factor of 2 may be performed according to the present methods. In the embodiment, nine different modes are considered as shown in FIG. 8, where mode 0 is a complete square and mode 1-8 are partial. FIG. 8 also marks the central regions of different modes using dot rectangles. In this embodiment, two different sizes of patches: 8×8 and 4×4 may be used, where mode 0-8 are used in 8×8 patches and only mode 0-4 are used in 4×4 patches. In such an embodiment, sufficient patches can be collected for SR reconstruct if the multi-shaped and multi-sized patches are used. One of ordinary skill in the art will recognize other suitable patch sizes and dimensions.

In the embodiment, the process may be implemented according to the following steps: first, the input LR image is divided into a plurality of overlapped patches using a sliding window; then, for each patch the SiSS values subject to the 9 modes as shown in FIG. 8 are calculated and evaluated. If the SiSS exceeds the threshold, the patch is copied to the enlarged image and blended with other overlapped patches. Finally, a back-projection is utilized to keep consistency between the reconstructed image 104 and the input LR image 102. The following pseudocode describes this embodiment using mode 0~8 and patch size 4×4 and 8×8:

Input: LR image L, Threshold $t_{4\times 4}$ and $t_{8\times 8}$, Weighting parameter $\sigma_p$ and $\sigma_f$, Threshold for fallback $t_f$.
Output: HR image H.

-continued

```
1   Set H(x,y)=0, Set weight image W(x,y)=0;
2   Compute a fallback image F(x,y) by resizing image L;
3   Divide L into 8×8 patches using a sliding window moving in ½-pixel
    step in X and Y directions;
4   for each patch P centered at (x_c, y_c)
5       Calculate SiSS_0 for mode 0 using Equation (3);
6       If SiSS_0 > t_{8×8}, then record patch P_0 and SiSS_0;
7       Calculate SiSS_0 ~ SiSS_8 for mode 0~8, record the maximum SiSS_m,
        and the corresponding P_m;
8       If SiSS_m > t_{8×8}, then record patch P_m and SiSS_m;
9       for each recorded patch P_i(x,y)
10          Calculate weight w_i(x,y) using Equation (5) given σ_p and σ_I,
            and calculate P'_i(x,y)=w(x,y)P_i(x,y);
11          Blending by H(u,v)=H(u,v)+P'_i(x,y) and W(u,v)=W(u,v)+w_i(x,y),
            where u=2x_c+x, v=2y_c+y;
12  Repeat step 2~10 using 4×4 patches and threshold t_{4×4};
13  for each pixel at (x,y) in H
14      If w(x,y) > t_f, then normalization by H(x,y)=H(x,y)/W(x,y), else
        fallback by H(x,y)=F(x,y);
15  Update H using back-projection
```

In Step 2, a fallback image is built by resizing the input LR image in a scale factor of 2. Although the multi-shaped and multi-sized patches are employed, in natural images there are always a small portion of complex structures and textures that are not SiSS. In this case the fallback image is used to fill the "holes" in the reconstructed image as shown in Step 14.

In Step 3, the 8×8 patches are collected using a sliding window moving in a ½-pixel step in X and Y directions, so that the patches have been aligned to the grid of the high-resolution image. More importantly, the sliding window makes the patches ½-pixel misalignments to each other, which makes it possible to recover potential high frequency information in reconstruction. In practice, since the sliding window with ½-pixel moving requires interpolation of the LR image, an enlarged image can be pre-calculated using bicubic or edge-guided interpolation may be used for patch collection.

Step 5~8 describes the multi-shaped patch selection using SiSS characteristics, where we use MSE as an example. It can be seen that when the $SiSS_0$ is calculated for mode 0 in Step 5, all the subtraction and multiplication operations in MSE have been done. Therefore, when the $SiSS_0$~$SiSS_8$ for mode 0-8 are calculated in Step 6, only add operations among pixels are required. Moreover, since the active pixels in mode 0-8 are rather regular as shown in FIG. 8, the MSE or SiSS can be efficiently calculated by an addition tree. As a result, although the proposed method utilizes 9 modes in total, the computation cost is only slightly higher than one single mode, which is more obvious in hardware implementation.

Since there is no patch searching involved in the proposed algorithm, the data fusion as shown in Step 10 and 11 becomes another hot spot in computation besides the SiSS calculation. Compared with Equation (5), the proposed weighting method described in Equation (6) has an additional exponential function. However, for an image of 8-bit pixel depth, there are only 256 possible values of the second term, so that the whole term can be realized by a LUT in a low computation cost.

From Step 3 to Step 11, the input low resolution image are divided into 8×8 patches; while Step 12 repeat this process but using smaller 4×4 patches. In other words, this embodiment uses a two-pass reconstruction process using 8×8 and 4×4 patches respectively, and then blend the results in Step 11 and Step 14. There may be alternative embodiment that process 4×4 patches at first, and then the 8×8 patches.

In some embodiments similar to method 600, the method may partition the image into both 8×8 and 4×4 in one pass or partition the image into different sizes (8×8 or 4×4) adaptively. For example, the first patch size may be 8×8 pixels. Then, for each patch of the first size, the method may include calculating the SiSS criterion ($SiSS_0$), for the whole patch (i.e., mode 0). If $SiSS_0$ is greater than a threshold, then the output is the patch of the first size. However, if $SiSS_0$ is below the threshold, then the SiSS value corresponding to each of a plurality of alternative patch modes is calculated to identify the mode with the greatest SiSS value. If this SiSS value is greater than the threshold, then the corresponding patch mode is selected for output of the partial patch for HR image reconstruction. Then, the low resolution image may be partitioned into patches of a second size, for example, 4×4 pixels. In general, the second size is smaller than the first size. The SiSS evaluation steps described above are repeated for each patch and then the method may include outputting the corresponding patches of the second size. In a particular embodiment, only a subset of modes, such as modes 0-4, may be considered for the patches of the second size.

In other embodiments similar to method 600, the method may use different size of the patches such as 6×6, 10×10, 12×12, and more over, only one size or more than 2 different sizes may be used. In other embodiments, the proportion between the patch and this central region may not be 2:1, so that the enlargement factor of the method is not 2. For example, the 6×6 patch and 4×4 central region can implement a enlargement factor of 1.5. One of ordinary skill in the art will recognize other suitable patch sizes and dimensions as well as the combinations of the aforementioned alternatives to method 600.

Figure 9:
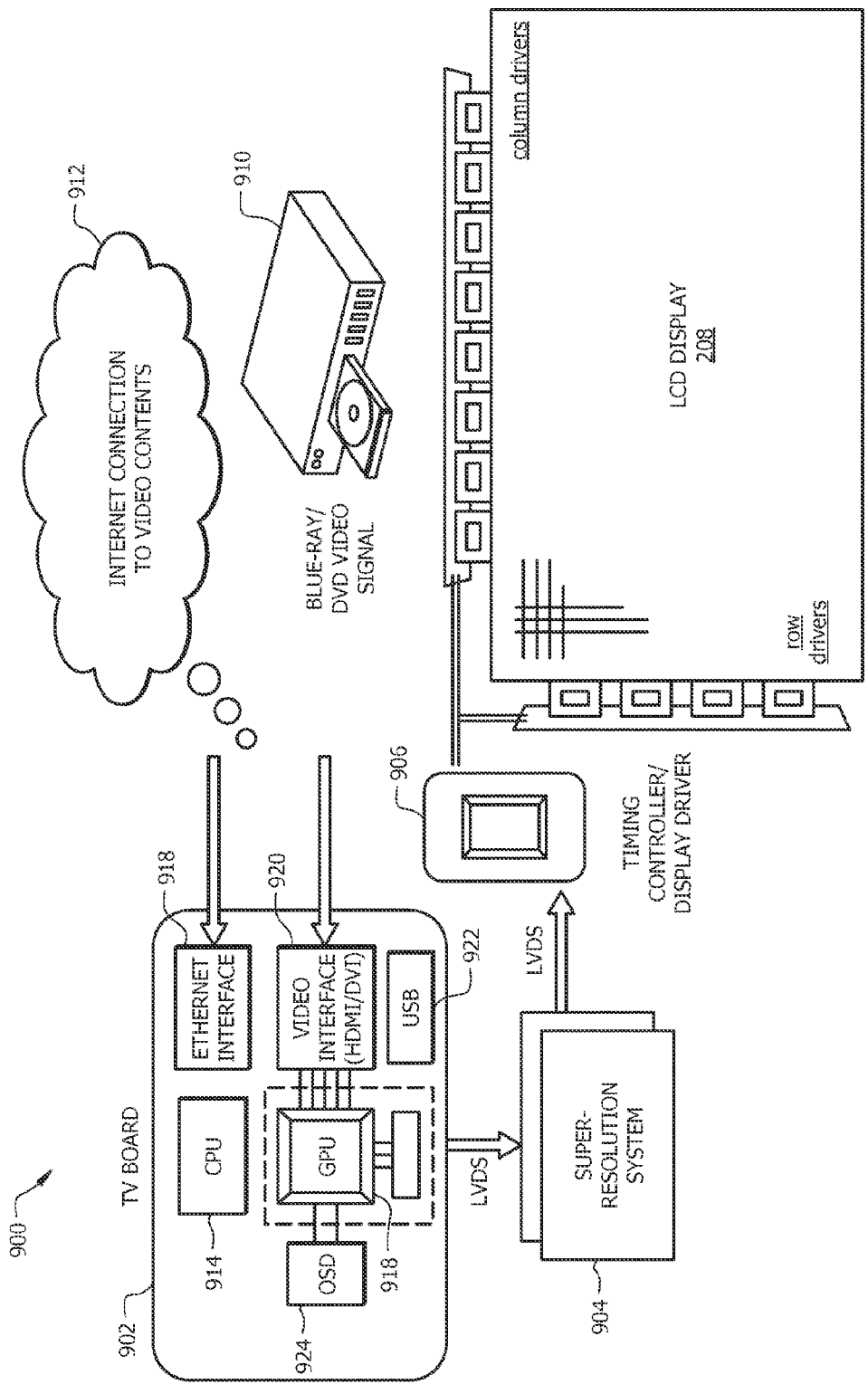
FIG. 9 illustrates one embodiment of a system for multi-patch based super-resolution from a single image or video frame.

FIG. 9 illustrates one embodiment of system 900 for multi-patch based super-resolution from a single image or video frame 102. In one embodiment, system 900 includes television receiver and/or video processing card 902. Additionally, system 900 includes an embodiment of a super-resolution system 904 configured for multi-patch based super-resolution from a single image or video frame 102. System 900 may also include timing controller and/or display driver 906 for controlling display of output images 104 from super-resolution system 904 on display device 908. In one embodiment, display device 908 may include a liquid crystal display (LCD) device, a projector, or the like.

In one embodiment, television card 902 may receive images or video frames from media reader device 910. In various embodiments, media reader device 910 may include a Blu-ray Disc device, a Digital Versatile Disc (DVD) player, or the like. Television card 902 may receive the images or video frames from media reader device 910 via video interface 920. Video interface 920 may include, for example, a High Definition Media Interface (HDMI) port or a Digital Video Interface (DVI) port.

Alternatively, television card 902 may receive images or video frames from an internet connection 912 to a server of media content. In one embodiment, television card 902 may receive the images or video frames via Ethernet port 918. Alternatively, a wireless network card or other device suitable for interacting with a network may be used.

Additionally, television card 902 may include Central Processing Unit (CPU) 914 and/or Graphics Processing Unit (GPU) 916. In one embodiment, one or both of CPU 914 and GPU 916 may be used to implement super-resolution system 904 or a portion thereof. For example, super-resolution system 904 may comprise firmware and/or software configured to load on CPU 914 or GPU 916 and be executed to perform the operations described herein. In further embodiments, USB port 922 and/or On Screen Display (OSD) 924 may be used for user-interaction with super-resolution system 904. In an alternative embodiment, super-resolution system 904 may be implemented independent of television card 902, for example in a stand-alone device. The various operations of super-resolution system may be performed by a processor, a Field Programmable Gate Array (FPGA), a Digital Signal Processor (DSP), a programmable Logic Chip (PLC), analog or digital circuitry, or the like. One of ordinary skill in the art will recognize various embodiments of hardware configurations suitably configured to operate as super-resolution system 904.

Figure 10:
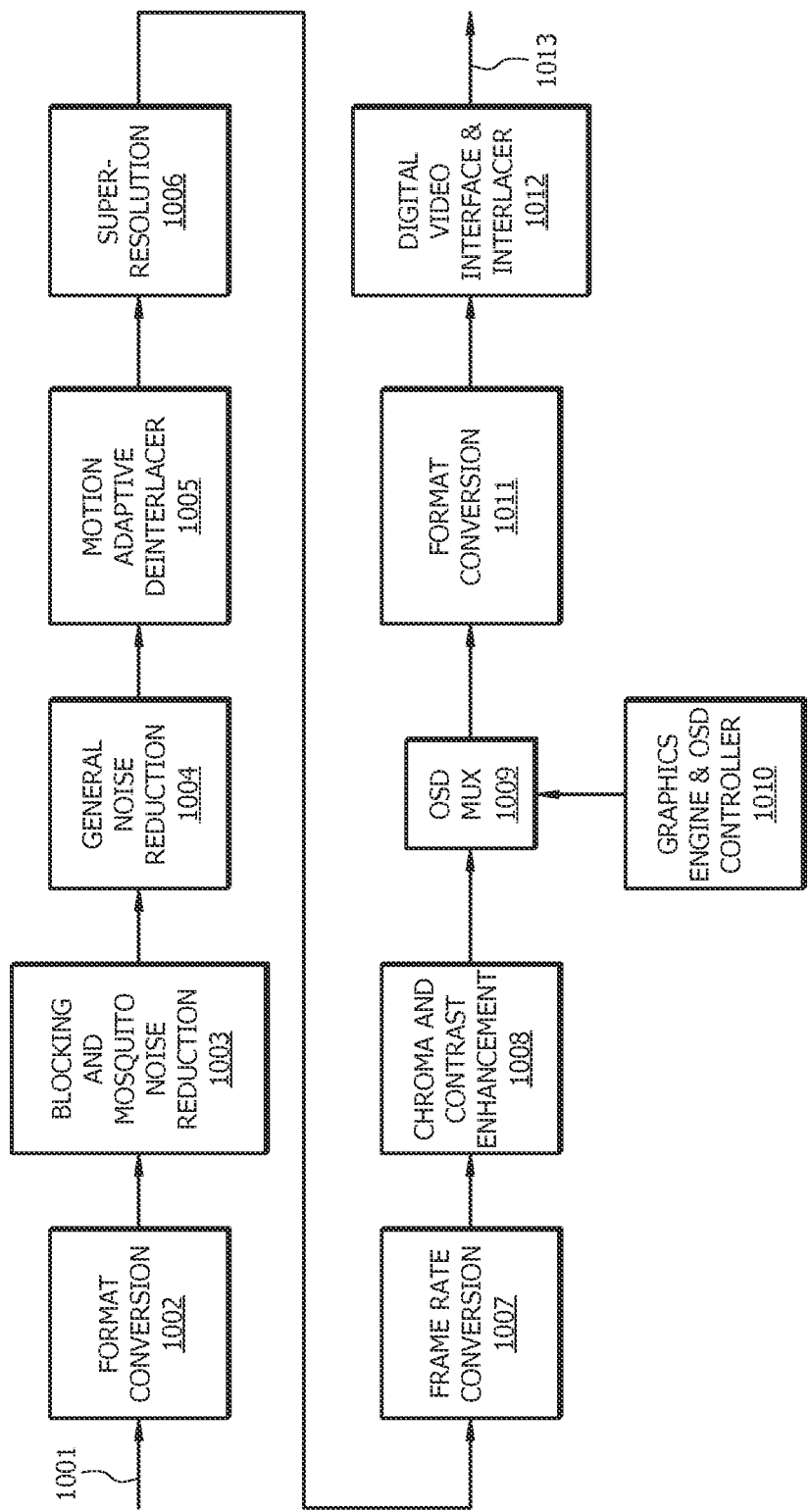
FIG. 10 illustrates one embodiment of a video processing system with multi-patch based super-resolution system.

FIG. 10. illustrates one embodiment of system 1000 for multi-patch based super-resolution in a video processing pipeline in TV/HDTV, set-top-box, network A/V receiver, DVD player and blu-ray player. In one embodiment, Block 1002 converts input digital video 1001 to appropriate format such as YUV 4:2:0 format that is feasible for internal process in 1000. Block 1003 removes blocking and mosquito noise, since input video 1001 may be encoded and decoded using video compression method such as MPEG, H.264/AVC and HEVC. Block 1004 removes other noise in the video such as Gaussian noise and film-grain noise. Block 1005 may use a motion adaptive method to convert the interlace input video to progressive video. Block 1006 is an embodiment of a super-resolution system configured for multi-patch based super-resolution to convert the low resolution video frames from Block 1005 to high resolution video frames. Block 1007 convert the frame rate to adapt to the display such as TV panel, LCD and projector. Block 1008 conduct color and contrast enhancement. Block 1009 blends the graphics contents and on-screen display (OSD) contents generated by Block 1010. Block 1011 and Block 1012 convert the video format for the target display device and drive the display interface such as VGA, DVI and HDMI.

The various operations of super-resolution system 1006 or the whole video process pipeline 1000 may be performed by a processor, a Field Programmable Gate Array (FPGA), a Digital Signal Processor (DSP), a programmable Logic Chip (PLC), analog or digital circuitry, or the like. One of ordinary skill in the art will recognize various embodiments of hardware configurations suitably configured to operate as super-resolution system 904.

Figure 11:
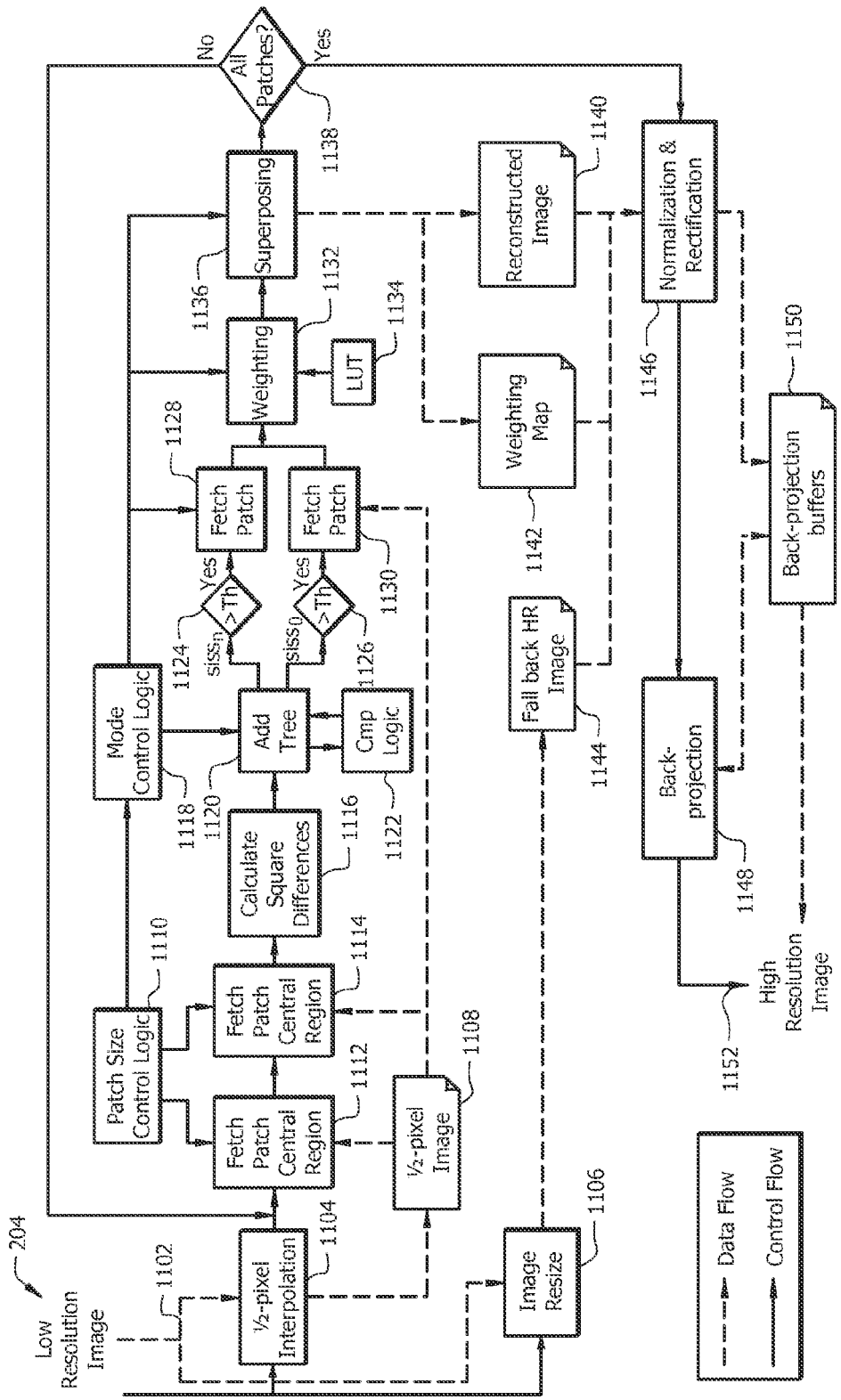
FIG. 11 illustrates one embodiment of an apparatus for multi-patch based super-resolution from a single image or video frame.

FIG. 11 illustrates one embodiment of an implementation of super-resolution system 904 and 1006. In this embodiment enlargement with a scale factor of 2 may be performed according to the present methods. In one embodiment, super-resolution system 904 may include an input port 1102 configured to receive a low resolution image 102.

Interpolation module 1104 may be configured to generate an interpolated image of a enlarged size from the low resolution image 102. For example, interpolation module 1104 may be configured to generate ½-pixel image 1108 using techniques such as bicubic and edge-guided interpolation. Similarly, image resize module 1106 may be configured to generate an image of a different size from the low resolution image 102. In one example, image resize module 1106 may generate an embodiment of high-resolution image 104 using a common technique. In such an embodiment, fallback high resolution image 1144 may be generated using a previously known method.

Once pixel interpolation module 1104 generates the interpolated image pixels, fetch patch central region module 1112 may be configured to select a patch of pixels in the image and identify a central region of the selected patch. Additionally, fetch down-sampled patch module 1114 may fetch a corresponding region of the down-sampled patch form the ½-pixel image.

Figure 12:
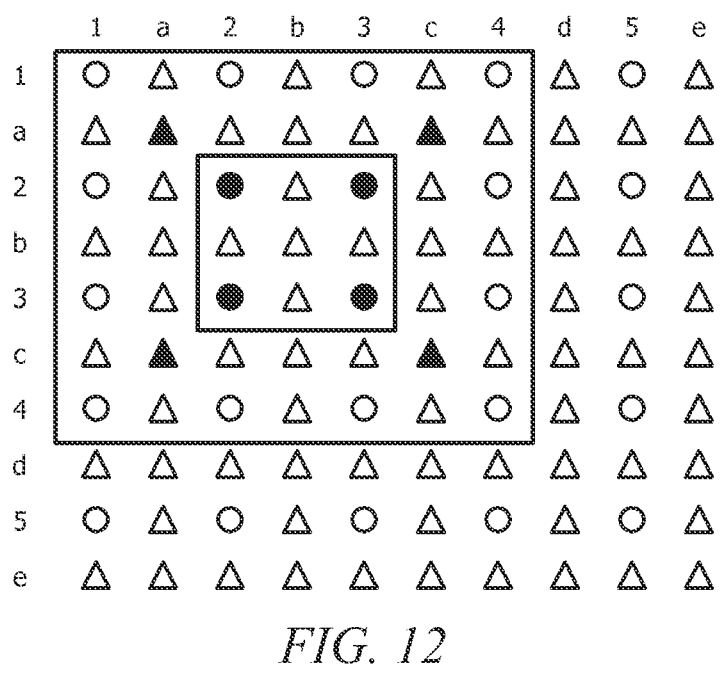

FIG. 12 illustrates one example to describe the operations in module 1112 and 1114. FIG. 12 shows an example local region of ½-pixel image 1108, the original pixels in the input LR image 102 are marked by circles and the interpolated pixels with ½-pixel misalignment which is generate by module 1104 are marked as triangles. For illustrative purposes, FIG. 12 describes a 4×4 patch with its top left corner at (1,1), which has 16 pixels marked as circles, i.e. pixel (1,1), (1,2), (1,3), 1,4), . . . , (4,4). According to Equation (2), additionally the MSE between the central region of the patch (i.e. pixel (2,2), (2,3), (3,2) and (3,3)) and the downsampled 4×4 patch may be calculated. In such an embodiment, there may be no need to downsample the 4×4 patch, because the pixel (a,a), (a,c), (c,a) and (c,c) are exactly the result downsamped pixels of the 4×4 patch. Therefore, the SiSS can be easily calculated by $$SiSS=-[(p(2,2)-p(a,a))2+(p(2,3)-p(a,c))2+(p(3,2)-p(c,a))2+(p(3,3)-p(c,c))2]/4. \qquad (7)$$

In order words, although Equation (2) and (3) require down-sampling operation of the patch, such an embodiment may not require any actual operation, since the downsample operations has been implicitly done in module 1104. In this case, the operation of the fetch patch central region module 1112 is to load the pixel (2,2), (2,3), (3,2) and (3,3); while the operation of the fetch down-sampled patch module 1114 is to load pixel (a,a), (a,c), (c,a) and (c,c).

The operations of both fetch patch central region module 1112 and fetch down-sampled patch module 1114 may be controlled by patch size control logic 1110. In one embodiment, module 1110 may implement the sliding window moving in ½-pixel step in the input image 102. Module provide coordinates top left corner the current patch and the size of the patch for module 1112 and 1114 respectively. For example, as shown in FIG. 12, module 1110 provide coordinate (1,1) and size 4 to module 1112 and 1114, so that module 1112 and 1114 can fetch the corresponding data aforementioned according to the coordinate and the patch size. In this embodiment, the coordinate may be increased in scan-line order in one-pixel step in image 1108 to exhaustively obtain all the patches. For example, as shown in FIG. 12. the sequence of the coordinates generated by 1110 may be (1,1), (1,a), (1,2), (1,b), . . . , (a,1), (a,a), (a,2), . . . , (2,1), (2,a), . . . . Since the ½ pixel image 1108 is two times larger than the input image 102, the operations of the control logic 1110 are equivalent to the sliding window moving in ½-pixel step in image 102. One of ordinary skill in the art will recognize various embodiments of 1110 to create coordinate in different orders such as zig-zag or pixel-by-pixel along edges suitably configured to operate as super-resolution system.

Patch size control logic 1110 may also be configured to provide input to mode control logic 1118. In one embodiment, module 1118 may determine the specific pixels belonging to the specific modes as shown in FIG. 8.

Once the central region of the patch and the down-sampled patch is obtained by module 1112 and 1114 respectively, logic module 1116, 1120 and 1118 may be configured to calculate the SiSS scores for each of the patch modes ($SiSS_0$~$SiSS_9$). For example, as for a 8×8 patch P, $P_c(x,y)$ may denote the central 4×4 region of P and $P_↓(x,y)$ the downsampled P. Firstly, the squared differences $d(x,y)=(Pc(x,y)-P_↓(x,))^2$ may be calculated in module 1116, where $0≤x,y≤3$.

Next, an addition tree implemented in module 1120 may be generated as below:

$$d0\_01=d(0,0)+d(0,1) \quad d0\_23=d(0,2)+d(0,3)$$

$$d1\_01=d(1,0)+d(1,1) \quad d1\_23=d(1,2)+d(1,3)$$

$$d2\_01=d(2,0)+d(2,1) \quad d2\_23=d(2,2)+d(2,3)$$

$$d3\_01=d(3,0)+d(3,1) \quad d3\_23=d(3,2)+d(3,3)$$

$$d0=d0\_01+d0\_23 \quad d1=d1\_01+d1\_23$$

$$d2=d2\_01+d2\_23 \quad d3=d3\_01+d3\_23$$

$$d01=d0+d1 \quad d23=d2+d3$$

where $d(0,0) \sim d(3,3)$ are squared differences calculated in the previous step, i.e. leaves in the addition tree; and $d0\_01 \sim d23$ are intermediate results, i.e. nodes in the addition tree.

Finally, the mode control logic 1118 controls the addition tree 1120 to compute the SiSS of mode 0~8:

$$SiSS0=-(d01+d23)/16$$

$$SiSS1=-d01/8$$

$$SiSS2=-d23/8$$

$$SiSS3=-(d0\_01+d1\_01+d2\_01+d3\_01)/8$$

$$SiSS4=-(d0\_23+d1\_23+d2\_23+d3\_23)/8$$

$$SiSS5=-(d01-d(1,3)+d2\_12+d(3,0))/10$$

$$SiSS6=-(d01-d(1,0)+d2\_23+d(3,3))/10$$

$$SiSS7=-(d(0,0)+d1\_12+d23-d(2,3))/10$$

$$SiSS8=-(d(0,3)+d1\_23+d23-d(2,0))/10$$

If only $SiSS_0$ is calculated, the operations are 16 multiplications and 31 additions/subtractions (the shift for normalization can be counted in the weighting step). If 9 modes (SiSS0~SiSS8) are calculated using embodiments of the present methods, the total operations are 16 multiplications, 50 additions/subtractions, 7 comparisons and 1 shifts (comparison of SiSS1 to SiSS8 can be implemented by 7 comparisons, 1 shifts and 1 additions; the shift and division for normalization can be merged to the calculations in the weighting step). Compared with the single shape patch (mode 0), the multi-shape patch method only required additional operations of 19 adds, 7 comparison and 1 shifts.

When the $SiSS_0 \sim SiSS_9$ are calculated, the compare logic 1122 may select one or multiple largest scores for successive processes in module 1124, 1126, 1128 and 1130. In one embodiment, module 1122 only select the largest score from $SiSS_1 \sim SiSS_9$ that are corresponding to partial patches as shown in FIG. 8. When the largest score $SiSS_i$ is selected, module 1126 compare it with a pre-defined threshold. If $SiSS_i$ is larger than the threshold, module 1130 will fetch the pixels of the correspond partial patch according to the output of the model control logic 1118 for the successive process. Meanwhile, the $SiSS_0$ which is corresponding to the whole patch as shown in FIG. 8 is also compared with a pre-defined threshold in module 1124. If $SiSS_0$ is larger than the threshold, module 1128 will fetch the pixels of the correspond partial patch according to the output of the model control logic 1118. In some embodiments, the compare logic 1122 may select top N SiSS scores for successive process. In some other embodiments, the compare logic 1122 may divide from $SiSS_0 \sim SiSS_9$ into several groups according to the geometrical or other features of the patch and partial patches, and then select top one or N in each group. In some other embodiments, module 1124 and 1126 may use a threshold adaptive to image content or some pre-defined strategy to select the patches.

Weighting module 1132 and Lookup Table (LUT) 1134 may be configured to add weighting information suitable for handling outlier pixels in each patch as described in equation (5). In one embodiment, Equation (5) may be used to assign a weight to each pixel in the fetched patches. In this case, the second term in Equation (5) pre-calculated and the results may be stored in the LUT 1134. When the weighting module 1132 calculate the weights, it sends the pixel values to the LUT 1134 and get the results of the second term of Equation (5) from the LUT 1134.

The superposing module 1136 implements Equation (6) to blend all the pixels in overlapped patches. In one embodiment, module 1136 calculates the numerator of Equation (6) and stores the results to a reconstruction image 1140; meanwhile, module 1136 also calculates the denominator of Equation (6) and store the results to a weighting map 1142. It needs to store the numerator and denominator separately, because the patches are processed in serial in this embodiment and for the current step the calculation of numerator or denominator may be incomplete. In this case, the division operation is done in the normalization and rectification module 1146 after all the patches are processed.

Decision module 1138 then determines if all patches have been processed. If not, the modules described above operate in a loop until all patches are processed.

Beside perform the division operation of Equation (6), the normalization and rectification module 1146 also merge the fall back HR image 1144 into the reconstructed image 1140. In one embodiment, for each pixel in the reconstructed image 1140, the module 1146 check the corresponding value in the weighting map 1142. If the weighting value is larger than a threshold, module 1146 performs the division operation and store the result to the back-projection buffers 1150; otherwise, module 1146 fetches the corresponding pixel in the fall back HR image 1142, and store the pixel value to the back-projection buffers 1150.

Finally, the back-projection module 1148 perform a normal back-projection algorithm and generate the final high resolution image 1152. Some intermediate data are also stored in the back-projection buffers 1150.

The system 900 or 1000 may be implemented in other similar embodiments. In some embodiments, the input low resolution image may be divided into a plurality of blocks. The block may be overlapping to each other to remove the boundary effects. In this case, the super-resolution modules as shown in FIG. 11. may process the image block by block in scan line order, rather than the whole image, so that the memory consumption of the internal buffers can be reduced apparently. Moreover, the latency of the super-resolution system is also reduced, since part of the high-resolution image 1152 has been created and can be outputted after one block rather than the whole image was inputted and processed.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving a first image having a first resolution for conversion into a second image having a second resolution;
partitioning the first image into a plurality of patches, the patches having variable properties;
processing properties of each of the plurality of patches for selection of the variable properties such that a scale-invariant self-similarity value of the plurality of patches is above a threshold; and
converting the first image into the second image using each of the plurality of patches with the selected variable properties.

2. The method of claim 1, wherein the variable properties include a patch size.

3. The method of claim 1, wherein the variable properties include a patch shape.

4. The method of claim 3, wherein each patch comprises one or more partial patches, each partial patch having a variable shape.

5. The method of claim 3, wherein each partial patch comprises one or more shapes determined by one or more lines from a center point of the patch to a boundary of the patch.

6. The method of claim 1, further comprising comparing a whole patch with a central region of the whole patch to determine the scale-invariant value.

7. The method of claim 6, wherein comparing the whole patch with the central portion of the whole patch comprises downscaling the whole patch to the same size as the central region.

8. The method of claim 1 further comprising calculating a similarity value between the central region of the whole patch and the downscaled whole patch.

9. The method of claim 1, wherein each of the patches comprises a region that overlaps one or more other patches.

10. The method of claim 1, further comprising applying back-projection to the second image.

11. The method of claim 9, wherein converting the first image into the second image further comprises:
calculating a first weight value in response to the self-similarity value;
mapping each pixel of the central region of the whole patch or partial patch to the corresponding pixel in the whole patch or partial patch;
calculating a second weight for each pixel in the whole patch or partial patch using the difference between the corresponding pixels of the whole patch or partial patch and the central region of the whole patch or partial patch;
combining the first weight and the second weight to determine an aggregate weight value; and
calculating a weighted sum of pixels in the whole patch and an overlapping patch in response to the aggregate weight value.

12. The method of claim 6, wherein the partial portion of the central region of the whole patch has a shape defined by the partial patch.

13. The method of claim 12, wherein the central region of the patch is centered by a central point of the patch.

14. The method of claim 6, wherein a proportion between the whole patch and the central region of the whole patch is the same as a proportion of the first image and the second image.

15. The method of claim 6, wherein calculating a similarity value further comprises calculating a scale-invariant self-similarity measurement of the whole patch and one or more corresponding partial patches using an addition tree.

16. A system comprising:
an input port configured to receive a first image having a first resolution for conversion into a second image having a second resolution; and
an image processor coupled to the input port and configured to:
partition the first image into a plurality of patches, the patches having variable properties;
process properties of each of the plurality of patches for selection of the variable properties such that a scale-invariant value of the plurality of patches is above a threshold; and
convert the first image into the second image using each of the plurality of patches with the selected variable properties.

17. The system of claim 16, wherein the variable properties include a patch size.

18. The system of claim 16, wherein the variable properties include a patch shape.

19. The system of claim 18, wherein each patch comprises one or more partial patches, each partial patch having a variable shape.

20. The system of claim 18, wherein each partial patch comprises one or more shapes determined by one or more lines from a center point of the patch to a boundary of the patch.

21. The system of claim 16, wherein the image processor is further configured to compare a whole patch with a central region of the whole patch to determine the scale-invariant value.

22. The system of claim 21, wherein comparing the whole patch with the central portion of the whole patch comprises downscaling the whole patch to the same size as the central region.

23. The system of claim 16, wherein the image processor is further configured to calculate a similarity value between the central region of the whole patch and the downscaled whole patch.

24. The system of claim 16, wherein each of the patches comprises a region that overlaps another patch.

25. The system of claim 24, wherein the image processor is further configured to:
calculate weight for pixels in each of the plurality of patches; and
calculate the weighted sum as the final pixel value for pixels in the regions that overlap another patch.

26. The system of claim 16, wherein the image processor is further configured to apply back-projection to the second image.

27. The system of claim 24, wherein converting the first image into the second image further comprises:
calculating a first weight value in response to the self-similarity value;
mapping each pixel of the central region of the whole patch or partial patch to the corresponding pixel in the whole patch or partial patch;
calculating a second weight for each pixel in the whole patch or partial patch using the difference between the corresponding pixels of the whole patch or partial patch and the central region of the whole patch or partial patch;
combining the first weight and the second weight to determine an aggregate weight value; and
calculating a weighted sum of pixels in the whole patch and an overlapping patch in response to the aggregate weight value.

28. The system of claim 21, wherein the a partial portion of the central region of the whole patch has a shape defined by the partial patch.

29. The system of claim 28, wherein the central region of the patch is centered by a central point of the patch.

30. The system of claim 21, wherein a proportion between the whole patch and the central region of the whole patch is the same as a proportion of the first image and the second image.

31. The system of claim 21, wherein calculating a similarity value further comprises calculating a scale-invariant self-similarity measurement of the whole patch and one or more corresponding partial patches using an addition tree.

* * * * *

UNITED STATES PATENT AND TRADEMARK OFFICE
CERTIFICATE OF CORRECTION

PATENT NO. : 8,675,999 B1
APPLICATION NO. : 13/630803
DATED : March 18, 2014
INVENTOR(S) : Luhong Liang et al.

Page 1 of 1

It is certified that error appears in the above-identified patent and that said Letters Patent is hereby corrected as shown below:

In the Specification

At column 1, line number 56, delete "ΔNN" and replace with --ANN--.

At column 4, line number 37, delete Equation 1 and replace with
-- $siss = \min_i \{F(C_i(P), D_i(P))\}$ --.

At column 9, line 8, delete step 7 and replace with
--7  Calculate $S/SS_0 \sim S/SS_8$ for mode 0~8, record the maximum $S/SS_m$ and the corresponding $P_m$;--.

At column 9, line 12, delete step 10 and replace with
--10  Calculate weight $w_i(x,y)$ using Equation (5) given $\sigma_P$ and $\sigma_I$, and calculate $P'_i(x,y)=w(x,y)P_i(x,y)$;--.

At column 9, line 14, delete step 11 and replace with
--11  Blending by $H(u,v)=H(u,v)+P'_i(x,y)$ and $W(u,v)=W(u,v)+w_i(x,y)$, where $u=2x_c+x$, $v=2y_c+y$;--.

At column 9, line 18, delete step 14 and replace with
--14  If $w(x,y) > t_f$, then normalization by $H(x,y)=H(x,y)/W(x,y)$, else fallback by $H(x,y)=F(x,y)$;--.

Signed and Sealed this
Third Day of June, 2014

Michelle K. Lee
*Deputy Director of the United States Patent and Trademark Office*